United States Patent
Cao et al.

(10) Patent No.: US 11,882,062 B2
(45) Date of Patent: *Jan. 23, 2024

(54) METHOD AND APPARATUS FOR WIRELESS COMMUNICATIONS

(71) Applicant: NXP USA, Inc., Austin, TX (US)

(72) Inventors: Rui Cao, Sunnyvale, CA (US); Hongyuan Zhang, Fremont, CA (US); Yan Zhang, Palo Alto, CA (US); Liwen Chu, San Ramon, CA (US)

(73) Assignee: NXP USA, Inc., Austin, TX (US)

( * ) Notice: Subject to any disclaimer, the term of this patent is extended or adjusted under 35 U.S.C. 154(b) by 51 days.

This patent is subject to a terminal disclaimer.

(21) Appl. No.: 17/349,801

(22) Filed: Jun. 16, 2021

(65) Prior Publication Data

US 2021/0391961 A1    Dec. 16, 2021

Related U.S. Application Data

(60) Provisional application No. 63/048,715, filed on Jul. 7, 2020, provisional application No. 63/039,538, filed on Jun. 16, 2020.

(51) Int. Cl.
*H04B 7/00* (2006.01)
*H04W 72/12* (2023.01)
*H04L 5/00* (2006.01)
*H04L 1/24* (2006.01)
*H04W 76/15* (2018.01)

(52) U.S. Cl.
CPC ............ *H04L 5/0007* (2013.01); *H04L 1/246* (2013.01); *H04L 5/0048* (2013.01); *H04W 76/15* (2018.02)

(58) Field of Classification Search
None
See application file for complete search history.

(56) References Cited

U.S. PATENT DOCUMENTS

| 9,942,008 | B1 | 4/2018 | Sun et al. |
| 10,128,917 | B2 * | 11/2018 | Tian ...................... H04L 1/0071 |
| 10,567,127 | B2 | 2/2020 | Sun et al. |
| 10,616,017 | B2 | 4/2020 | Liu et al. |
| 11,019,660 | B2 * | 5/2021 | Baron ................ H04W 74/0816 |
| 11,218,275 | B2 * | 1/2022 | Porat ..................... H04L 5/0057 |

(Continued)

FOREIGN PATENT DOCUMENTS

| KR | 20180079513 A | 7/2018 |
| WO | 2007078712 A2 | 7/2007 |

OTHER PUBLICATIONS

IEEE, "IEEE P802.11ax™/D6.0", Draft Standard for Information technology—Telecommunications and information exchange between systems Local and metropolitan area networks Specific requirements, Nov. 2019, 780 pgs.

(Continued)

*Primary Examiner* — Sithu Ko

(57) ABSTRACT

Embodiments of a method and an apparatus for wireless communications are disclosed. In an embodiment, a method for wireless communications involves encoding bits in a Physical Layer Protocol Data Unit (PPDU) using a basic bandwidth that is smaller than a signal bandwidth, wherein the bits are duplicated within the PPDU, and transmitting the PPDU with duplicated bits in accordance with a power spectrum density (PSD) limit.

22 Claims, 10 Drawing Sheets

(56) References Cited

U.S. PATENT DOCUMENTS

| | | | |
|---|---|---|---|
| 11,553,525 B2* | 1/2023 | Baron | H04W 72/569 |
| 2015/0349995 A1 | 12/2015 | Zhang et al. | |
| 2017/0026151 A1 | 1/2017 | Adachi | |
| 2017/0230220 A1* | 8/2017 | Anwyl | H04L 5/0044 |
| 2018/0069669 A1* | 3/2018 | Park | H04L 5/0007 |
| 2018/0160429 A1* | 6/2018 | Seok | H04L 1/0618 |
| 2018/0213566 A1 | 7/2018 | Baron et al. | |
| 2018/0242355 A1 | 8/2018 | Lou et al. | |
| 2019/0116014 A1 | 4/2019 | Gan | |
| 2020/0228380 A1* | 7/2020 | Yang | H04L 27/2621 |
| 2021/0184707 A1* | 6/2021 | Hasnain | H04B 1/0053 |
| 2021/0274500 A1 | 9/2021 | Cariou et al. | |
| 2021/0289500 A1* | 9/2021 | Yang | H04L 5/0044 |
| 2021/0367886 A1* | 11/2021 | Chen | H04L 45/74 |
| 2021/0385688 A1* | 12/2021 | Liu | H04L 27/0012 |
| 2021/0392661 A1 | 12/2021 | Cao et al. | |
| 2022/0294558 A1 | 9/2022 | Park et al. | |
| 2022/0393792 A1* | 12/2022 | Lim | H04L 5/0044 |
| 2022/0408462 A1 | 12/2022 | Cao | |
| 2022/0416988 A1 | 12/2022 | Cao et al. | |
| 2023/0261788 A1* | 8/2023 | Lim | H04L 27/2602 370/329 |

OTHER PUBLICATIONS

U.S. Appl. No. 17/349,809, filed Jun. 16, 2021.
IEEE 802,1-20/0789rl, Liu et al (Mediatek), "Distributed tone design" Apr. 28, 2020, 21 pages.
IEEE 802,11-20/xxxxr0, Yang et al (Qualcomm), "Further Discussion on PSD Limited Transmission" Jun. 15, 2020, 18 pages.
IEEE P802.11 ax/D6.1 "27.3.12.13 Pilot subcarriers", May 2020, 5 pages.
Non-Final Office Action for U.S. Appl. No. 17/349,809 dated Feb. 13, 2023.
Khorov et al., "A Tutorial on IEEE 802.11ax High Efficiency WLANs," IEEE Communications Surveys & Tutorials, vol. 21, No. 1, First Quarter 2019, 20 pages.
Notice of Allowance for U.S. Appl. No. 17/349,809 dated Jun. 28, 2023.
Notice of Allowance for U.S. Appl. No. 17/349,809 dated Nov. 16, 2023.

* cited by examiner

METHOD AND APPARATUS FOR WIRELESS COMMUNICATIONS

CROSS-REFERENCE TO RELATED APPLICATIONS

This application is entitled to the benefit of U.S. Provisional Patent Application Ser. No. 63/039,538, filed on Jun. 16, 2020, and U.S. Provisional Patent Application Ser. No. 63/048,715, filed on Jul. 7, 2020, each of which is incorporated by reference herein.

BACKGROUND

In wireless communications, wireless devices, e.g., Access Point (AP) multi-link devices (MLDs) or non-AP MLDs, e.g., station (STA) multi-link devices (STA MLDs), can execute various multi-link operations, such as transmission and reception of frames via one or more communication links. As an example, a wireless AP MLD may transmit and receive Physical Layer Protocol Data Units (PPDUs) with a wireless non-AP MLD on multiple links to exchange information and transmit data. However, when a PPDU is transmitted in accordance with a power spectrum density (PSD) limit, the PPDU may be subject to a restricted transmission range and/or a restricted data rate. Therefore, because the PPDU may be subject to the restricted transmission range and/or the restricted data rate, wireless communications may not be performed efficiently.

SUMMARY

Embodiments of a method and an apparatus for wireless communications are disclosed. In an embodiment, a method for wireless communications involves encoding bits in a Physical Layer Protocol Data Unit (PPDU) using a basic bandwidth that is smaller than a signal bandwidth, wherein the bits are duplicated within the PPDU, and transmitting the PPDU with duplicated bits in accordance with a power spectrum density (PSD) limit.

In an embodiment, the PPDU is a non-Orthogonal Frequency-Division Multiple Access (non-OFDMA) PPDU transmitted via a duplicated transmission.

In an embodiment, a duplicated PPDU format is used when the PPDU is at least one of a Media Access Control (MAC) control frame and a MAC management frame.

In an embodiment, the duplicated PPDU format is a non-High-Throughput (non-HT) duplicate (DUP) PPDU format, and wherein the basic bandwidth uses a non-HT PPDU format.

In an embodiment, the basic bandwidth of a duplicated PPDU format uses at least one of a duplicated High-Efficiency (HE) single-user (SU) PPDU and a duplicated HE extended range (ER)-SU PPDU.

In an embodiment, bits encoded in a 20 MHz preamble portion of the PPDU include bandwidth information that indicates the signal bandwidth, wherein the bits encoded in the 20 MHz preamble portion of the PPDU are duplicated across the signal bandwidth, and wherein a data portion of the PPDU uses a data rate of at most binary phase shift keying (BPSK).

In an embodiment, the data portion of the PPDU is modulated using the basic bandwidth that is duplicated within at least one data segment of the signal bandwidth, and wherein at least one of a per-basic bandwidth polarity change and a per-subcarrier phase rotation is applied to the data portion of the PPDU.

In an embodiment, the basic bandwidth is at least one of 20 MHz, 40 MHz, 80 MHz, and 160 MHz.

In an embodiment, the data portion of the PPDU is modulated using the signal bandwidth and a data rate of BPSK-Dual Carrier Modulation (DCM)+DUP.

In an embodiment, for a signal bandwidth of at most 160 MHz, bits included in the data portion of the PPDU are encoded and modulated using one fourth of data subcarriers included in the signal bandwidth, and wherein the bits modulated using one fourth of the data subcarriers are duplicated onto four subblocks of the signal bandwidth.

In an embodiment, for a signal bandwidth of at least 320 MHz, bits included in the data portion of the PPDU are parsed into two data segments and are encoded and modulated using one fourth of data subcarriers included in each segment, and wherein the bits modulated using one fourth of the data subcarriers are duplicated onto four segments of the signal bandwidth.

In an embodiment, at least one of a polarity change and the per-subcarrier phase rotation is applied to each duplication of the data subcarriers onto the four subblocks of a segment within the signal bandwidth.

In an embodiment, a per-subcarrier conjugate is applied to each duplication of the data subcarriers onto four segments of the signal bandwidth.

In an embodiment, the data portion of the PPDU is modulated using at least one of a 40 MHz bandwidth and an 80 MHz bandwidth that is duplicated across the signal bandwidth, and the data portion uses a data rate of at least one of a Quadrature Carrier Modulation (QCM), BPSK-DCM+DUP, and a one fourth coding rate.

In an embodiment, when the data portion uses the data rate of BPSK-DCM+DUP, the data portion is encoded via MCS0+DCM+2× duplication.

In an embodiment, bits included in the data portion of the PPDU are encoded and modulated onto a segment using half of the signal bandwidth, and wherein the bits encoded and modulated onto the segment are duplicated onto another segment.

In an embodiment, bits included in the data portion of the PPDU are encoded onto a segment using half of the signal bandwidth, wherein the bits encoded onto the segment are duplicated onto other segments N times, and wherein N is a maximum number of times a segment is duplicated.

In an embodiment, when the PPDU is transmitted in a frequency band of less than 6 GHz, there is no PSD limit for the transmission of the PPDU, and wherein frequency bands utilized in a less than 6 GHz range include at least one of Unlicensed National Information Infrastructure (U-NII)-1, U-NII-2A, U-NII-2B, U-NII-2C, U-NII-3, U-NII-4, or U-NII-5.

In an embodiment, when the PPDU is transmitted in a frequency band of 6 GHz, the PSD is limited to 5 dBm per 1 MHz for an Access Point (AP) and −1 dBm per 1 MHz for a non-AP station (STA), and wherein frequency bands utilized within a 6 GHz range include at least one of U-NII-5, U-NII-6, U-NII-7, or U-NII-8 U-NII-5, U-NII-6, U-NII-7, and U-NII-8.

An embodiment of a wireless device is also disclosed. The wireless device includes a processor configured to encode bits in a PPDU using a basic bandwidth that is smaller than a signal bandwidth, wherein the bits are duplicated within the PPDU, and transmit the PPDU with duplicated bits in accordance with a PSD limit.

Other aspects in accordance with the invention will become apparent from the following detailed description,

BRIEF DESCRIPTION OF THE DRAWINGS

Throughout the description, similar reference numbers may be used to identify similar elements.

DETAILED DESCRIPTION

Figure 1:
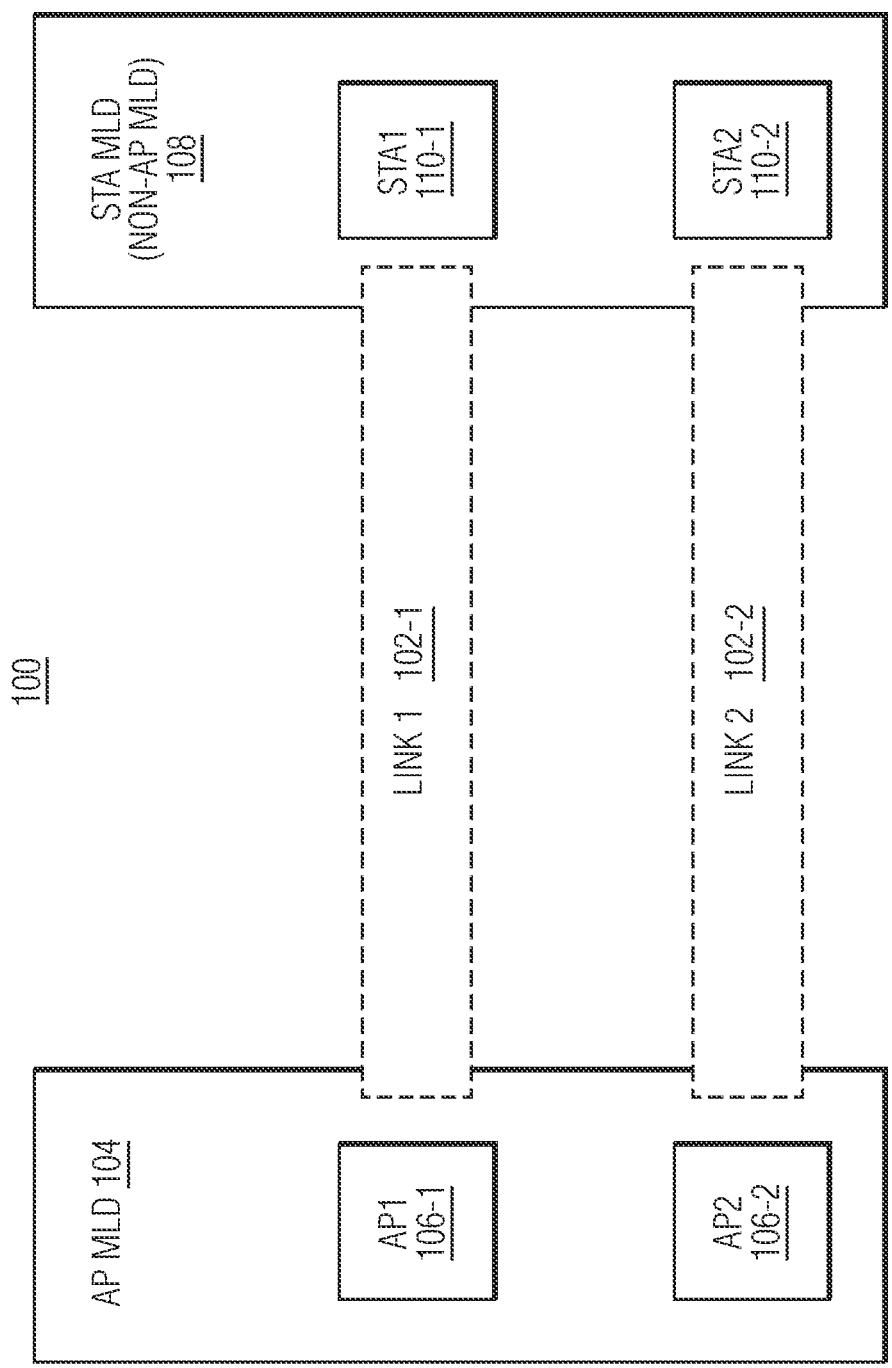
FIG. 1 depicts a multi-link communications system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

In embodiments of a wireless communications system, an access point (AP) affiliated with an AP multi-link device (MLD) (e.g., wireless device) of a wireless local area network (WLAN) transmits data to at least one associated non-AP station (STA) affiliated with a non-AP STA MLD (e.g., a STA MLD). The AP MLD is configured to operate with associated non-AP MLDs according to a communication protocol. For example, the communication protocol may be an Extremely High Throughput (EHT) communication protocol, or Institute of Electrical and Electronics Engineers (IEEE) 802.11be communication protocol. Features of wireless communications and multi-link communication systems operating in accordance with the EHT communication protocol and/or next-generation communication protocols may be referred to herein as "non-legacy" features. In some embodiments of the wireless communications system described herein, different associated STAs within range of an AP operating according to the EHT communication protocol are configured to operate according to at least one other communication protocol, which defines operation in a Basic Service Set (BSS) with the AP, but are generally affiliated with lower data throughput protocols. The lower data throughput communication protocols (e.g., IEEE 802.11n, IEEE 802.11ac, IEEE 802.11ax, etc.) may be collectively referred to herein as "legacy" communication protocols.

FIG. 1 depicts a multi-link communications system 100 that is used for wireless (e.g., WiFi) communications. In the embodiment depicted in FIG. 1, the multi-link communications system includes one AP multi-link device, which is implemented as AP MLD 104, and one non-AP STA multi-link device, which is implemented as STA MLD 108. The multi-link communications system can be used in various applications, such as industrial applications, medical applications, computer applications, and/or consumer or enterprise applications. In some embodiments, the multi-link communications system is a wireless communications system, such as a wireless communications system compatible with an IEEE 802.11 protocol. For example, the multi-link communications system may be a wireless communications system compatible with the IEEE 802.11be protocol.

Although the depicted multi-link communications system 100 is shown in FIG. 1 with certain components and described with certain functionality herein, other embodiments of the multi-link communications system may include fewer or more components to implement the same, less, or more functionality. For example, in some embodiments, the multi-link communications system includes multiple AP MLDs with one STA MLD, or multiple AP MLDs with more than one STA MLD. In another example, although the multi-link communications system is shown in FIG. 1 as being connected in a certain topology, the network topology of the multi-link communications system is not limited to the topology shown in FIG. 1. Although the system described with reference to FIG. 1 involves multi-link communications, the techniques described herein are also applicable to single-link communications.

In the embodiment depicted in FIG. 1, the AP MLD 104 includes two radios, implemented as access points (APs) 106-1 and 106-2. In such an embodiment, the APs may be AP1 106-1 and AP2 106-2. In some embodiments, the AP MLD 104 implements upper layer Media Access Control (MAC) functionalities (e.g., block acknowledgement establishment, reordering of frames, etc.) and the APs 106-1 and 106-2 implement lower layer MAC functionalities (e.g., backoff, frame transmission, frame reception, etc.). The APs 106-1 and 106-2 may be implemented in hardware (e.g., circuits), software, firmware, or a combination thereof. The APs 106-1 and 106-2 may be fully or partially implemented as an integrated circuit (IC) device. In some embodiments, the APs 106-1 and 106-2 are wireless APs compatible with at least one WLAN communications protocol (e.g., at least one IEEE 802.11 protocol). For example, the APs 106-1 and 106-2 may be wireless APs compatible with the IEEE 802.11be protocol. In some embodiments, an AP is a wireless AP that connects to a local area network (e.g., a LAN) and/or to a backbone network (e.g., the Internet) through a wired connection and that wirelessly connects to wireless stations (STAs), for example, through one or more WLAN communications protocols, such as the IEEE 802.11 protocol. In some embodiments, an AP includes at least one antenna, at least one transceiver operably connected to the at least one antenna, and at least one controller operably connected to the corresponding transceiver. In some embodiments, the at least one transceiver includes a physical layer (PHY) device. The at least one controller may be configured to control the at least one transceiver to process received packets through the at least one antenna. In some embodiments, the at least one controller is implemented within a processor, such as a microcontroller, a host processor, a host, a digital signal processor (DSP), or a central processing unit (CPU), which can be integrated in a corresponding transceiver. In some embodiments, each of the APs 106-1 or 106-2 of the AP MLD 104 may operate in a different size BSS operating channel. For example, AP1 106-1 may operate in a 320 MHz BSS operating channel and AP2 106-2 may operate in a 160 MHz BSS operating channel. Although the AP MLD 104 is shown in FIG. 1 as including two APs, other embodiments of the AP MLD 104 may include more than two APs.

In the embodiment depicted in FIG. 1, the non-AP STA multi-link device, implemented as STA MLD 108, includes two radios which are implemented as non-AP STAs 110-1 and 110-2. In such an embodiment, the non-AP STAs may be STA1 110-1 and STA2 110-2. The STAs 110-1 and 110-2 may be implemented in hardware (e.g., circuits), software, firmware, or a combination thereof. The STAs 110-1 and 110-2 may be fully or partially implemented as an IC device.

In some embodiments, the non-AP STAs 110-1 and 110-2 are part of the STA MLD 108, such that the STA MLD is a communications device that wirelessly connects to wireless APs. For example, the STA MLD 108 may be implemented in a laptop, a desktop personal computer (PC), a mobile phone, or other communications device that supports at least one WLAN communications protocol. In some embodiments, the non-AP STA MLD 108 is a communications device compatible with at least one IEEE 802.11 protocol (e.g., the IEEE 802.11be protocol). In some embodiments, the STA MLD 108 implements a common MAC data service interface and the non-AP STAs 110-1 and 110-2 implement a lower layer MAC data service interface. In some embodiments, the AP MLD 104 and/or the STA MLD 108 identifies which communication links support the multi-link operation during a multi-link operation setup phase and/or exchanges information regarding multi-link capabilities during the multi-link operation setup phase. In some embodiments, each of the non-AP STAs 110-1 and 110-2 of the STA MLD 108 may operate in a different frequency band. For example, the non-AP STA 110-1 may operate in a frequency band less than 6 GHz (e.g., 2.4 GHz or 5 GHz) and the non-AP STA 110-2 may operate in frequency band of 6 GHz. In some embodiments, each STA includes at least one antenna, at least one transceiver operably connected to the at least one antenna, and at least one controller connected to the corresponding transceiver. In some embodiments, the at least one transceiver includes a PHY device. The at least one controller may be configured to control the at least one transceiver to process received packets through the at least one antenna. In some embodiments, the at least one controller is implemented within a processor, such as a microcontroller, a host processor, a host, a DSP, or a CPU, which can be integrated in a corresponding transceiver.

In the embodiment depicted in FIG. 1, the STA MLD 108 communicates with the AP MLD 104 via two communication links, e.g., link1 102-1 and link2 102-2. For example, each of the non-AP STAs 110-1 or 110-2 communicates with an AP 106-1 or 106-2 via corresponding communication links 102-1 or 102-2. In an embodiment, a communication link (e.g., link1 102-1 or link2 102-2) may include a BSS operating channel established by an AP (e.g., AP1 106-1 or AP2 106-2) that features multiple 20 MHz channels used to transmit frames (e.g., Physical Layer Protocol Data Units (PPDUs), Beacons, management frames, etc.) between a first wireless device (e.g., an AP) and a second wireless device (e.g., a non-AP STA). In some embodiments, a 20 MHz channel may be a punctured 20 MHz channel or an unpunctured 20 MHz channel. In some embodiments, the 20 MHz channels may be aggregated to form a segment (e.g., an 80 MHz segment or a 160 MHz segment). Although the STA MLD 108 is shown in FIG. 1 as including two non-AP STAs, other embodiments of the STA MLD 108 may include one non-AP STA or more than two non-AP STAs. In addition, although the AP MLD 104 communicates (e.g., wirelessly communicates) with the STA MLD 108 via multiple links 102-1 and 102-2, in other embodiments, the AP MLD 104 may communicate (e.g., wirelessly communicates) with the STA MLD 108 via one link or more than two communication links.

In some embodiments, wireless devices (e.g., APs or non-AP STAs) operating according to at least one legacy communication protocol may operate in a frequency band of less than 6 GHz. In some embodiments, frequency bands utilized in a less than 6 GHz range may include, for example, Unlicensed National Information Infrastructure (U-NII)-1, U-NII-2A, U-NII-2B, U-NII-2C, U-NII-3, U-NII-4, or U-NII-5. For wireless devices operating in frequency bands less than 6 GHz, there may be no power spectrum density (PSD) limit for wireless transmissions or the PSD limit may be higher than a practical PSD of a packet that a STA can transmit. Instead, for wireless devices operating in frequency bands less than 6 GHz, there may be a per-STA Equivalent Isotopically Radiated Power (EIRP) limit. Thus, to extend transmission range in frequency bands less than 6 GHz, wireless devices (e.g., APs or non-AP STAs) operating according to at least one legacy communication protocol may, for example, reduce transmission bandwidth of a PPDU to increase per-subcarrier power.

However, in some embodiments, wireless devices (e.g., APs or non-AP STAs) operating according to at least one non-legacy communication protocol (e.g., the EHT communication protocol) may operate in a frequency band of 6 GHz. In some embodiments, frequency bands utilized within a 6 GHz range may include, for example, U-NII-5, U-NII-6, U-NII-7, or U-NII-8. In an embodiment, a low power indoor (LPI) transmission mode that may be in accordance with, for example, Federal Communications Commission (FCC) regulations, may be defined for transmissions in the frequency band of 6 GHz. In some embodiments, the LPI transmission mode may include a PSD limit for wireless devices (e.g., APs or non-AP STAs) transmitting PPDUs in the 6 GHz frequency band. For example, when a PPDU is transmitted in a frequency band of 6 GHz, the PSD may be limited to 5 dBm per 1 MHz for an AP and −1 dBm per 1 MHz for a non-AP STA. In such an example, wireless devices (e.g., APs or non-AP STAs) operating according to at least one non-legacy communication protocol (e.g., the EHT communication protocol) may have to increase PPDU bandwidth to allow for greater transmission power and extended transmission range in non-Orthogonal Frequency-Division Multiple Access (non-OFDMA) extended transmissions. As a result, different communication techniques that can extend the transmission range of a PPDU transmitted in accordance with a PSD limit in non-OFDMA extended transmissions may be desirable.

In accordance with an embodiment of the invention, a technique for wireless communications may involve encoding bits in a PPDU using a basic bandwidth that is smaller than a signal bandwidth, wherein the bits are duplicated within the PPDU, and transmitting the PPDU with duplicated bits in accordance with a PSD limit. Thus, techniques described herein may enable wireless devices to increase the power of PPDUs transmitted in PSD limited transmissions. Increasing the power of PPDUs transmitted in PSD limited transmissions may allow wireless devices to achieve longer range transmission in frequency bands with a PSD limit and may further enable wireless communications to be performed more efficiently.

Functional block diagrams of techniques for encoding bits in a PPDU where the bits are duplicated within the PPDU are described in further detail below with reference to FIGS. 2A-2D.

Figure 2A:
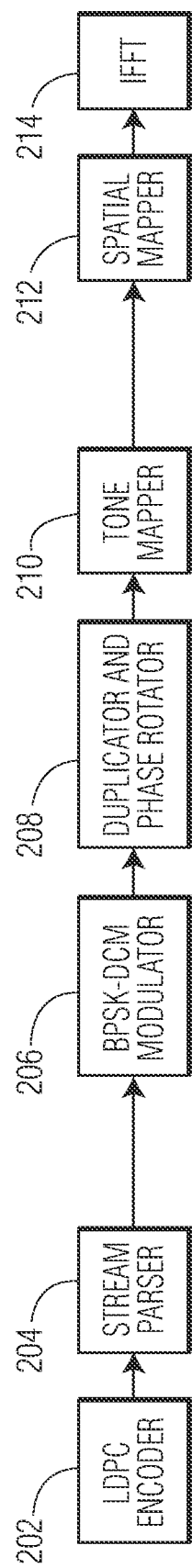
FIG. 2A is a functional block diagram of a technique for encoding bits in a Physical Layer Protocol Data Unit (PPDU), such that the bits are duplicated within the PPDU in accordance with an embodiment of the invention.

FIG. 2A is a functional block diagram of a technique for encoding bits in a PPDU (not shown), such that the bits are duplicated within the PPDU in accordance with an embodiment of the invention. With reference to FIG. 2A, the functional block diagram includes a Low-Density Parity-Check (LDPC) encoder 202 (e.g., a forward error correction encoder) that encodes scrambled information bits to generate encoded data bits for the PPDU. In an embodiment, the functional block diagram also includes a stream parser 204 that receives and parses the encoded data bits into one or more spatial streams. In such an embodiment, a binary phase shift keying (BPSK) Dual Carrier Modulation (DCM) (BPSK-DCM) modulator 206 then modulates the parsed bits to include information to be transmitted in the PPDU.

In an embodiment, a duplicator and phase rotator 208 may then receive the modulated bits and perform duplication and/or phase rotation in accordance with a signal bandwidth of the PPDU. Examples of the signal bandwidth may include a bandwidth of 20 MHz, 40 MHz, 80 MHz, 160 MHz, or less than 320 MHz. In some embodiments, "duplicated" may imply that the contents (e.g., data, information, bits, etc.) of each field for a 20 MHz channel of the PPDU are duplicated across the signal bandwidth and/or are the same for each corresponding field in other 20 MHz channels of the PPDU. In some embodiments, a "phase rotation" may imply that a number of phase rotation parameters may be applied to subcarriers (sometimes referred to herein as "tones") included in the signal bandwidth. In some embodiments, the modulated bits may be duplicated and/or undergo phase rotation for each 20 MHz of the signal bandwidth. In an embodiment, after the bits undergo duplication and/or phase rotation, a tone mapper 210 reorders constellation points according to a tone remapping function. As an example, the tone remapping function may map consecutive coded information bits or blocks of information bits onto nonconsecutive subcarriers to facilitate data recovery at a wireless device that receives the PPDU for cases in which consecutive subcarriers are adversely affected during transmission. In an embodiment, a spatial mapper 212 then maps the reordered constellation points onto at least one transmission chain for an inverse fast Fourier transformer, implemented as IFFT 214. At the IFFT 214, bits of a corresponding transmission chain undergo inverse fast Fourier transform (IFFT) in generating the PPDU.

With reference to FIG. 2A, the PPDU (not shown) prepared by the functional block diagram may be transmitted by a wireless device (e.g., an AP or a non-AP STA) (not shown) with a signal bandwidth that may be less than 320 MHz. As an example, the signal bandwidth may be the bandwidth (e.g., 20 MHz, 40 MHz, 80 MHz, or 160 MHz) of the PPDU that may be transmitted by the wireless device. In some embodiments, the PPDU prepared by the functional block diagram shown in FIG. 2A may be a non-OFDMA PPDU, a duplicated High-Efficiency (HE) single-user (SU) PPDU, a duplicated HE extended range (ER)-SU PPDU, an HE PPDU, or an EHT PPDU that may be transmitted via a duplicated transmission by a wireless device in accordance with a PSD limit.

Figure 2B:
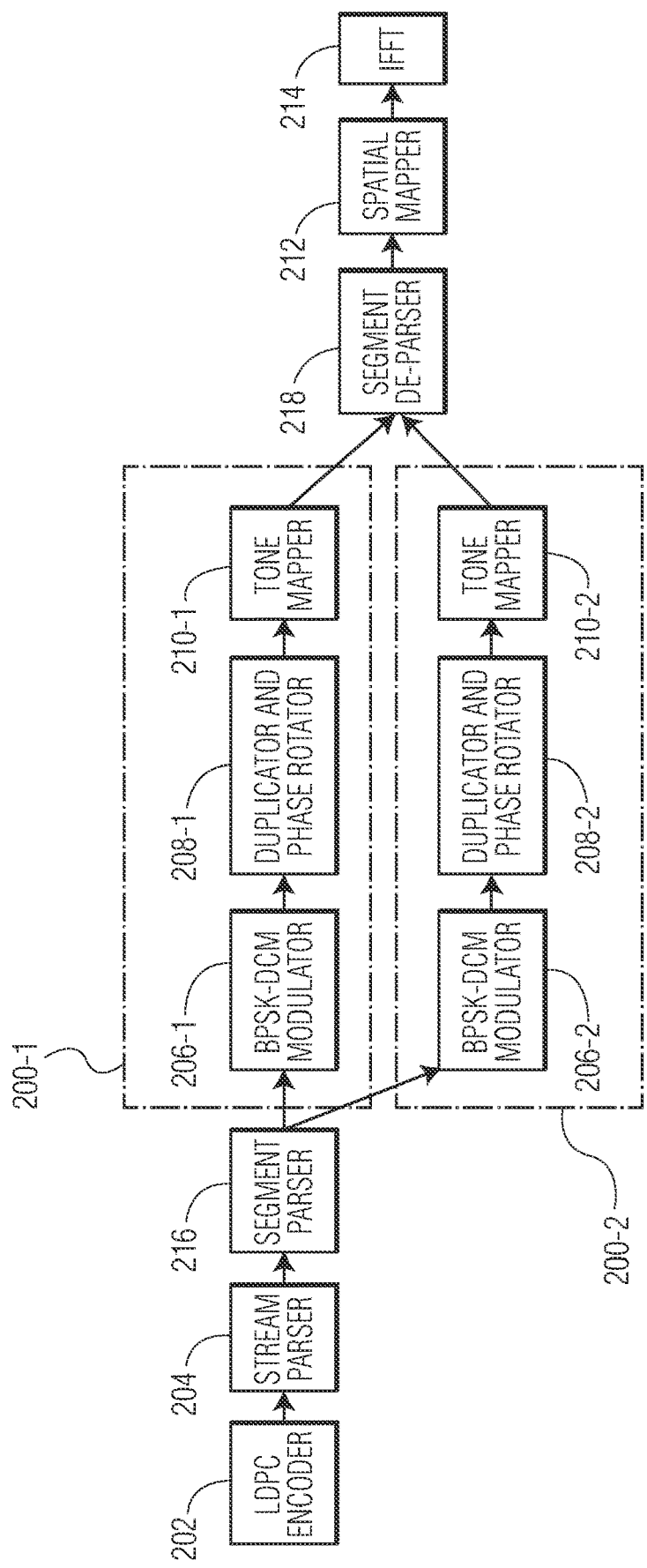
FIG. 2B is another functional block diagram of a technique for encoding bits in a PPDU, such that the bits are duplicated within the PPDU in accordance with an embodiment of the invention.

FIG. 2B is another functional block diagram of a technique for encoding bits in a PPDU (not shown), such that the bits are duplicated within the PPDU in accordance with an embodiment of the invention. With reference to FIG. 2B, the functional block diagram includes an LDPC encoder 202 (e.g., a forward error correction encoder) that encodes scrambled information bits to generate encoded data bits for the PPDU. In an embodiment, the functional block diagram also includes a stream parser 204 that receives and parses the encoded bits into one or more spatial streams for a segment parser 216. At the segment parser 216, the encoded bits parsed into one or more spatial streams are received and parsed into at least two segments for PPDU segment duplication processes, implemented as a first PPDU segment duplication process 200-1 and a second PPDU segment duplication process 200-2.

According to the first PPDU segment duplication process 200-1, a first BPSK-DCM modulator 206-1 modulates a parsed segment to include information to be transmitted in the PPDU. In an embodiment, a first duplicator and phase rotator 208-1 may then receive the modulated bits and perform duplication and/or phase rotation in accordance with a signal bandwidth of the PPDU. Examples of the signal bandwidth may include a bandwidth of at least 320 MHz. In some embodiments, the modulated bits may be duplicated and/or undergo phase rotation for each 20 MHz, 40 MHz segment, 80 MHz segment, or 160 MHz segment of the signal bandwidth. In an embodiment, after the bits undergo duplication and/or phase rotation, a first tone mapper 210-1 reorders constellation points according to a tone remapping function. As an example, the tone remapping function may map consecutive coded information bits or blocks of information bits onto nonconsecutive subcarriers to facilitate data recovery at a wireless device that receives the PPDU for cases in which consecutive subcarriers are adversely affected during transmission.

According to the second PPDU segment duplication process 200-2, a second BPSK-DCM modulator 206-2 modulates another parsed segment to include information to be transmitted in the PPDU. In an embodiment, a second duplicator and phase rotator 208-2 may then receive the modulated bits and perform duplication and/or phase rotation in accordance with the signal bandwidth of the PPDU. Examples of the signal bandwidth may include a bandwidth of at least 320 MHz. In some embodiments, the modulated bits may be duplicated and/or undergo phase rotation for each 20 MHz channel, 40 MHz segment, or 80 MHz segment of the signal bandwidth. In an embodiment, after the bits undergo duplication and/or phase rotation, a second tone mapper 210-2 reorders constellation points according to a tone remapping function. As an example, the tone remapping function may map consecutive coded information bits or blocks of information bits onto nonconsecutive subcarriers to facilitate data recovery at the wireless device that receives the PPDU for cases in which consecutive subcarriers are adversely affected during transmission.

In an embodiment, a segment de-parser 218 then receives each tone mapped segment from the first PPDU segment duplication process 200-1 and the second PPDU segment duplication process 200-2. In such an embodiment, the segment de-parser 218 de-parses each segment for a spatial mapper 212. In an embodiment, the spatial mapper 212 then maps the reordered constellation points of each de-parsed segment onto at least one transmission chain for an inverse fast Fourier transformer, implemented as IFFT 214. At the IFFT 214, bits of a corresponding transmission chain undergo IFFT in generating the PPDU.

With reference to FIG. 2B, the PPDU (not shown) prepared by the functional block diagram may be transmitted by a wireless device (e.g., an AP or a non-AP STA) (not shown) with a signal bandwidth of at least 320 MHz. As an example, the signal bandwidth may be the bandwidth (e.g., 320 MHz) of the PPDU that may be transmitted by the wireless device.

Figure 2C:
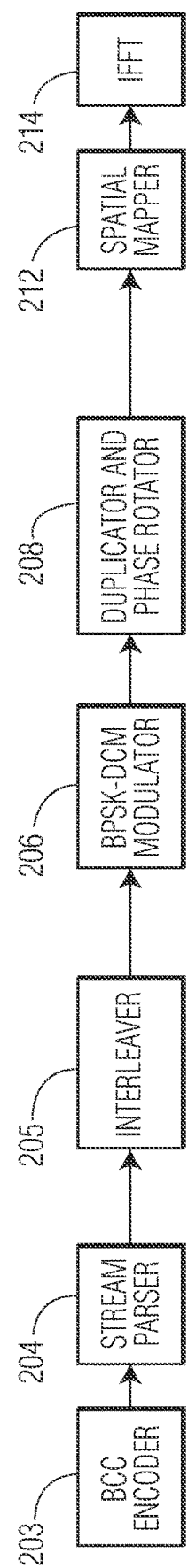
FIG. 2C is another functional block diagram of a technique for encoding bits in a PPDU, such that the bits are duplicated within the PPDU in accordance with an embodiment of the invention.

FIG. 2C is another functional block diagram of a technique for encoding bits in a PPDU (not shown), such that the bits are duplicated within the PPDU in accordance with an embodiment of the invention. With reference to FIG. 2C, the functional block diagram includes a binary convolutional code (BCC) encoder 203 (e.g., a forward error correction encoder) that encodes scrambled information bits to generate encoded data bits for the PPDU. In another embodiment, the BCC encoder 203 includes a binary convolutional encoder followed by a puncturing block. In an embodiment, the functional block diagram also includes a stream parser 204 that receives and parses the encoded data bits into one or more spatial streams. In an embodiment, an interleaver 205 receives the parsed bits of the one or more spatial streams and interleaves the bits of the corresponding spatial streams.

In such an embodiment, a BPSK-DCM modulator 206 then modulates the interleaved bits to include information to be transmitted in the PPDU. In an embodiment, a duplicator and phase rotator 208 may then receive the modulated bits and perform duplication and/or phase rotation in accordance with a signal bandwidth of the PPDU. Examples of the signal bandwidth may include a bandwidth of 20 MHz, 40 MHz, 80 MHz, 160 MHz, or less than 320 MHz. In some embodiments, "duplicated" may imply that the contents (e.g., data, information, bits, etc.) of each field for a 20 MHz channel of the PPDU are duplicated across the signal bandwidth and/or are the same for each corresponding field in other 20 MHz channels of the PPDU. In some embodiments, a "phase rotation" may imply that a number of phase rotation parameters may be applied to subcarriers (sometimes referred to herein as "tones") included in the signal bandwidth. In some embodiments, the modulated bits may be duplicated and/or undergo phase rotation for each 20 MHz of the signal bandwidth. In an embodiment, a spatial mapper 212 then maps reordered constellation points onto at least one transmission chain for an inverse fast Fourier transformer, implemented as IFFT 214. At the IFFT 214, bits of a corresponding transmission chain undergo IFFT in generating the PPDU.

With reference to FIG. 2C, the PPDU (not shown) prepared by the functional block diagram may be transmitted by a wireless device (e.g., an AP or a non-AP STA) (not shown) with a signal bandwidth that may be less than 320 MHz. As an example, the signal bandwidth may be the bandwidth (e.g., 20 MHz, 40 MHz, 80 MHz, or 160 MHz) of the PPDU that may be transmitted by the wireless device. In some embodiments, the PPDU prepared by the functional block diagram shown in FIG. 2C may be a non-OFDMA PPDU, a duplicated High-Efficiency (HE) single-user (SU) PPDU, a duplicated HE extended range (ER)-SU PPDU, an HE PPDU, or an EHT PPDU that may be transmitted via a duplicated transmission by a wireless device in accordance with a PSD limit.

Figure 2D:
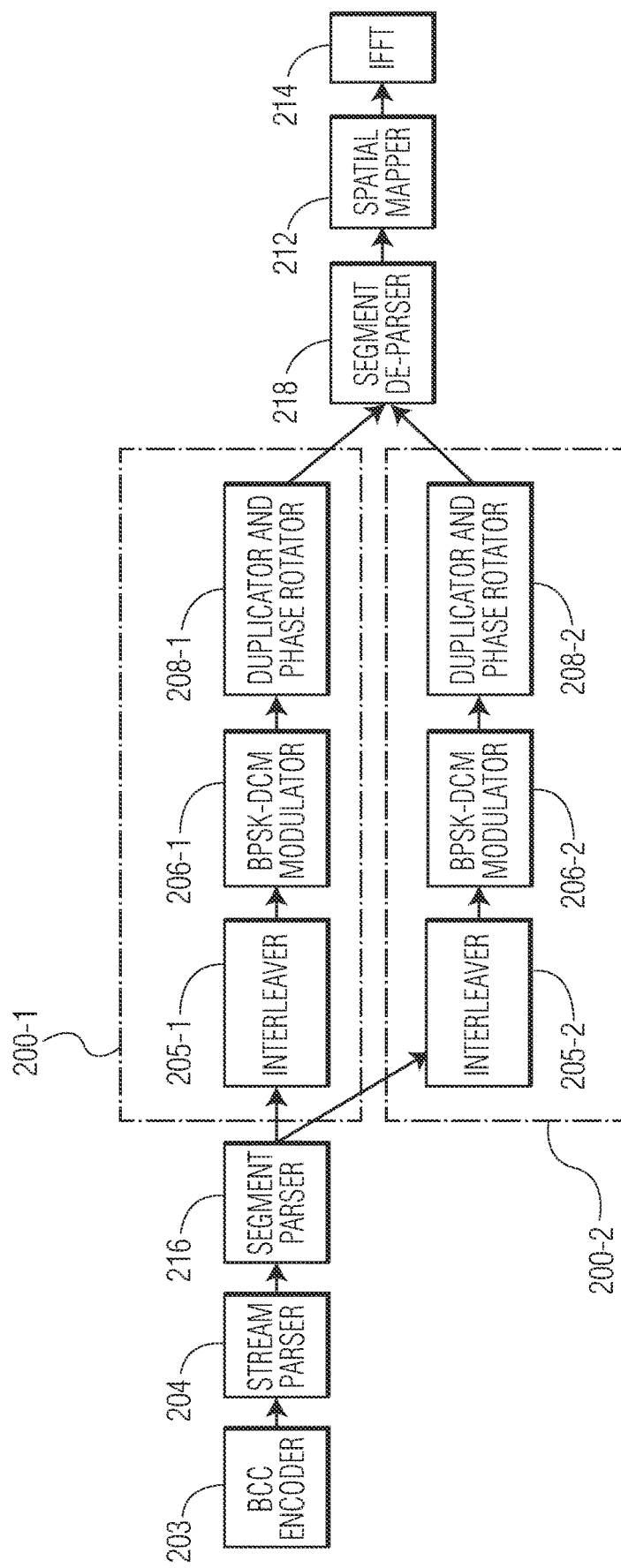
FIG. 2D is another functional block diagram of a technique for encoding bits in a PPDU, such that the bits are duplicated within the PPDU in accordance with an embodiment of the invention.

FIG. 2D is another functional block diagram of a technique for encoding bits in a PPDU (not shown), such that the bits are duplicated within the PPDU in accordance with an embodiment of the invention. With reference to FIG. 2D, the functional block diagram includes a BCC encoder 203 (e.g., a forward error correction encoder) that encodes scrambled information bits to generate encoded data bits for the PPDU. In another embodiment, the BCC encoder 203 includes a binary convolutional encoder followed by a puncturing block. In an embodiment, the functional block diagram also includes a stream parser 204 that receives and parses the encoded bits into one or more spatial streams for a segment parser 216. At the segment parser 216, the encoded bits parsed into one or more spatial streams are received and parsed into at least two segments for PPDU segment duplication processes, implemented as a first PPDU segment duplication process 200-1 and a second PPDU segment duplication process 200-2.

According to the first PPDU segment duplication process 200-1, a first interleaver 205-1 receives the parsed bits of the one or more spatial streams and interleaves the bits of the corresponding spatial streams into at least one interleaved segment. In an embodiment, a first BPSK-DCM modulator 206-1 modulates an interleaved segment to include information to be transmitted in the PPDU. In an embodiment, a first duplicator and phase rotator 208-1 may then receive the modulated bits and perform duplication and/or phase rotation in accordance with a signal bandwidth of the PPDU. Examples of the signal bandwidth may include a bandwidth of at least 320 MHz. In some embodiments, the modulated bits may be duplicated and/or undergo phase rotation for each 20 MHz, 40 MHz segment, 80 MHz segment, or 160 MHz segment of the signal bandwidth.

According to the second PPDU segment duplication process 200-2, a second interleaver 205-2 receives the parsed bits of the one or more spatial streams and interleaves the bits of the corresponding spatial streams into at least one interleaved segment. In an embodiment, a second BPSK-DCM modulator 206-2 modulates another interleaved segment to include information to be transmitted in the PPDU. In an embodiment, a second duplicator and phase rotator 208-2 may then receive the modulated bits and perform duplication and/or phase rotation in accordance with the signal bandwidth of the PPDU. Examples of the signal bandwidth may include a bandwidth of at least 320 MHz. In some embodiments, the modulated bits may be duplicated and/or undergo phase rotation for each 20 MHz channel, 40 MHz segment, or 80 MHz segment of the signal bandwidth.

In an embodiment, a segment de-parser 218 then receives each segment from the first PPDU segment duplication process 200-1 and the second PPDU segment duplication process 200-2. In such an embodiment, the segment de-parser 218 de-parses each segment for a spatial mapper 212. In an embodiment, the spatial mapper 212 then maps reordered constellation points of each de-parsed segment onto at least one transmission chain for an inverse fast Fourier transformer, implemented as IFFT 214. At the IFFT 214, bits of a corresponding transmission chain undergo IFFT in generating the PPDU.

With reference to FIG. 2D, the PPDU (not shown) prepared by the functional block diagram may be transmitted by a wireless device (e.g., an AP or a non-AP STA) (not shown) with a signal bandwidth of at least 320 MHz. As an example, the signal bandwidth may be the bandwidth (e.g., 320 MHz) of the PPDU that may be transmitted by the wireless device.

In some embodiments, for an ER transmission of MAC management frames and/or MAC control frames (e.g., beacon frames, block Acknowledgement (Ack) frames, Request-to-Send (RTS) frames, Clear-to-Send (CTS) frames, etc.) by wireless devices operating according to at least one non-legacy communication protocol (e.g., the EHT communication protocol), a non-High-Throughput (non-HT) duplicate (DUP) PPDU format may be used, such that the non-HT DUP PPDU format may be in accordance with the IEEE 802.11ax communication protocol and may use a duplicated PPDU format. In some embodiments, a wireless device (e.g., an EHT non-AP STA) that receives the MAC management frames and/or MAC control frames using the non-HT DUP PPDU format may perform implicit bandwidth detection and per-20 MHz combining for the received frames. For example, the implicit bandwidth detection and per-20 MHz combining for the received frames may involve determining the bandwidth of the received frames and combining information as per each 20 MHz channel of the corresponding frames. In some embodiments, the EHT non-AP STA may be mandated to perform implicit bandwidth detection and maximal ratio combining (MRC) for preamble and data decoding of received MAC management frames and/or MAC control frames. In some embodiments, the EHT non-AP STA may have greater sensitivity than an HE non-AP STA which may also have limited channel accessibility. However, in some embodiments, a new PPDU format may be implemented for preambles of PPDUs in ER transmissions and explicit bandwidth signaling.

In some embodiments, for transmission in a frequency band of 6 GHz, MAC management frames and/or MAC control frames may need to support HE non-AP STAs, EHT non-AP STAs, and/or other non-legacy non-AP STAs. For example, MAC management frames and/or MAC control frames may use an HE SU PPDU, an HE ER-SU PPDU, a duplicated HE SU PPDU, and/or a duplicated HE ER-SU PPDU to support transmissions in the frequency band of 6 GHz.

In some embodiments, for an ER transmission of MAC management frames and/or MAC control frames (e.g., beacon frames, block Ack frames, RTS frames, CTS frames, etc.) by wireless devices operating according to at least one non-legacy communication protocol (e.g., the EHT communication protocol), a duplicated HE SU PPDU or a duplicated HE ER-SU PPDU may be used to improve detectability at a non-AP STA (e.g., an EHT non-AP STA or an HE non-AP STA). For example, using the duplicated HE SU PPDU for MAC management frames and/or MAC control frames may improve preamble detection at the non-AP STA via a Repeated Legacy Signal field (RL-SIG), such that RL-SIG may be included in the preamble of the duplicated HE SU PPDU. As another example, using the duplicated HE ER-SU PPDU for MAC management frames and/or MAC control frames may further improve preamble detection at the non-AP STA via a Legacy Short Training field (L-STF) and/or a Legacy Long Training field (L-LTF) power boost and repetition of an HE Signal A field (HE-SIGA), such that L-STF, L-LTF, and HE-SIGA may each be included in the preamble of the duplicated HE-ER SU PPDU. In some embodiments, using the duplicated HE ER-SU PPDU for MAC management frames and/or MAC control frames may also improve data detection by using Resource Unit-242 (RU242) DCM and/or Resource Unit-106 (RU106) DCM.

An example of a duplicated HE (ER-)SU PPDU that may be used for a MAC control frame and/or a MAC management frame is described in further detail below with reference to FIG. 3.

Figure 3:
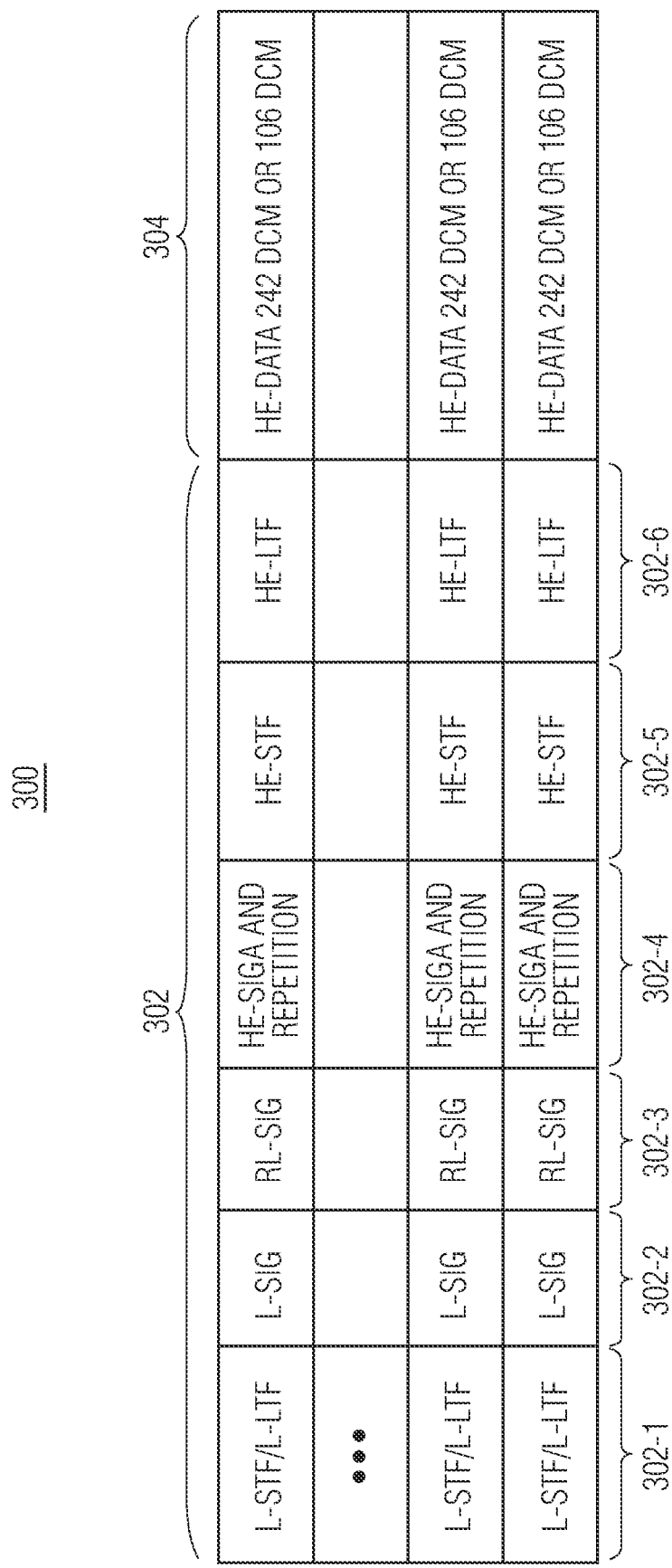
FIG. 3 depicts an example of a duplicated High-Efficiency (HE) (extended range (ER)) single-user (SU) PPDU that may be used as a Media Access Control (MAC) control frame and/or a MAC management frame that may be transmitted by a wireless device in accordance with a power spectrum density (PSD) limit.

FIG. 3 depicts an example of a duplicated HE (ER-)SU PPDU, 300, that may be used as a MAC control frame and/or a MAC management frame that may be transmitted by a wireless device in accordance with a PSD limit. In some embodiments, a duplicated PPDU format is used for the MAC control frame and/or the MAC management frame. In particular, FIG. 3 depicts a 20 MHz preamble portion 302 and a data portion 304 that are each included in the duplicated HE (ER-)SU PPDU 300. With reference to FIG. 3, each row included in the duplicated HE (ER-)SU PPDU 300 may represent a 20 MHz channel of a signal bandwidth, such that the four rows shown in FIG. 3 may collectively represent a signal bandwidth of 80 MHz. However, in some embodiments (not shown), the signal bandwidth is not limited to 80 MHz and may be, for example, 160 MHz or 320 MHz, such that the signal bandwidth would therefore include eight 20 MHz channels or sixteen 20 MHz channels, respectively.

In an embodiment, the 20 MHz preamble portion 302 of the duplicated HE (ER-)SU PPDU 300 includes six fields that are duplicated for each 20 MHz channel of the signal bandwidth. The six fields of the 20 MHz preamble portion 302 are implemented as a first field 302-1 (shown as including L-STF/L-LTF), a second field 302-2 (shown as including Legacy Signal field (L-SIG)), a third field 302-3 (shown as including RL-SIG), a fourth field 302-4 (shown as including HE-SIGA and repetition), a fifth field 302-5

(shown as including HE-Short Training field (HE-STF)), and a sixth field 302-6 (shown as including HE-Long Training field (HE-LTF)). In some embodiments, "duplicated" may imply that the contents (e.g., data, information, bits, etc.) of each field for a 20 MHz channel are duplicated across the signal bandwidth and/or are the same for each corresponding field in other 20 MHz channels of the PPDU. For example, the contents of the first field 302-1 (shown as L-STF/L-LTF) in a first 20 MHz channel (shown by the first row) of the duplicated HE (ER-)SU PPDU 300 may be repeated and/or the same as the contents of the first field in a second 20 MHz channel (shown by the second row), a third 20 MHz channel (shown by the third row), a fourth 20 MHz channel (shown by the fourth row), and/or other 20 MHz channels (not shown) included in the signal bandwidth of the PPDU.

In an embodiment, the data portion 304 of the duplicated HE (ER-)SU PPDU 300 may include one field (shown as including HE-Data 242 DCM or 106-DCM). As an example, the data portion 304 may include bandwidth information, data rate information, decoding information, etc. In addition, the data portion 304 may improve detection at non-AP STAs by using RU242 DCM and/or RU106 DCM.

With reference to FIG. 3, the duplicated HE (ER-)SU PPDU 300 may be defined for using HE-SU or HE ER-SU in each 20 MHz channel of the signal bandwidth, such that HE-SU or HE ER-SU may be duplicated for each 20 MHz channel. In some embodiments, a per-20 MHz phase rotation may be applied to mitigate peak-to-average power ratio (PAPR), for example, the same phase rotation of an EHT PPDU preamble may also be applied. In some embodiments, duplication and or phase rotation of each 20 MHz channel may be performed via the duplicator and phase rotator 208 for signal bandwidths less than 320 MHz, or either the first duplicator and phase rotator 208-1 or the second duplicator and phase rotator 208-2 for signal bandwidths of at least 320 MHz. In some embodiments, for an EHT non-AP STA, a receiver may open up to 80 MHz (e.g., four 20 MHz channels) of a preamble for improved detection. In some embodiments, to further enhance the transmission range of the duplicated HE (ER-)SU PPDU 300, more than a 3 dB power boost may be applied to the first field 302-1 (shown as including L-STF/L-LTF) in a duplicate HE ER-SU PPDU. In another embodiment, to further enhance the range of the duplicated HE (ER-) SU PPDU 300, the duplicated HE (ER-)SU PPDU 300 may include explicit bandwidth information that indicates wider bandwidths (e.g., bandwidth greater than 20 MHz) in the fourth field 302-4 (shown as including HE-SIGA and repetition) of secondary 20 MHz channels.

In some embodiments, for a full-bandwidth data transmission by wireless devices operating according to at least one non-legacy communication protocol (e.g., the EHT communication protocol), a data rate of at most BPSK (e.g., BPSK-DCM) may need to be defined to extend transmission range. As an example, the full-bandwidth data transmission may involve the transmission of a PPDU, such that the bandwidth of the PPDU covers a signal bandwidth (e.g., 80 MHz, 160 MHz, 320 MHz, etc.). In some embodiments, for the full-bandwidth data transmission, duplicated PPDU frame formats which may be similar to a non-HT DUP PPDU format may be defined for the full-bandwidth data transmission. As an example, the duplicated PPDU format may be a non-HT DUP PPDU format which is used for a MAC control frame and/or a MAC management frame, and a basic bandwidth may use a non-HT PPDU format. In some embodiments, explicit signaling of a preamble included in a DUP PPDU may help improve preamble detection for the full-bandwidth data transmission, such that an ER preamble design may be needed to further enhance packet detection. In addition, a tone plan that uses the full-bandwidth data transmission of the PPDU can be defined for improved Orthogonal Frequency-Division Multiplexing (OFDM) efficiency.

In some embodiments, for a full-bandwidth data transmission by wireless devices operating according to at least one non-legacy communication protocol (e.g., the EHT communication protocol), greater bandwidths (e.g., bandwidths of at least 320 MHz) may allow for more transmission power (e.g., 24 dBm for a wireless device transmitting a 320 MHz PPDU) to be implemented in the transmission of PPDUs. As MAC management frames and MAC control frames may already define a duplicated format for transmissions in greater bandwidth, an improved range may be achieved by using a data rate of at most BPSK-DCM. In some embodiments, for full-bandwidth transmission of an HE PPDU, a data portion of the HE PPDU may be jointly encoded with a data rate of at least MCS0–DCM to improve transmission range. However, to achieve improved transmission range for EHT PPDUs, an even lower rate may be needed.

To improve the transmission range of EHT PPDUs, wireless devices (e.g., APs or non-AP STAs) may implement at least one of three ER transmission techniques described herein. According to a first ER transmission technique, an EHT-DUP PPDU may be defined to improve the transmission range of PPDUs in a full-bandwidth transmission. According to a second ER transmission technique, a data rate of at most BPSK-DCM may be defined to improve the transmission range of PPDUs in a full-bandwidth transmission. According to a third ER transmission technique, a combination of the first ER transmission technique and the second ER transmission technique may be implemented. For example, according to the third ER transmission technique, a combination of the EHT-DUP PPDU and the data rate of at most BPSK-DCM may be defined to improve the transmission range of PPDUs in a full-bandwidth transmission. In addition to each of the three ER transmission techniques, an ER preamble format may be included to match a preamble detection range and a data decoding range as implemented by each corresponding ER transmission technique.

Example of PPDUs encoded with duplicated bits that may be transmitted by a wireless device are described in further detail below with reference to FIGS. 4A-4C.

Figure 4A:
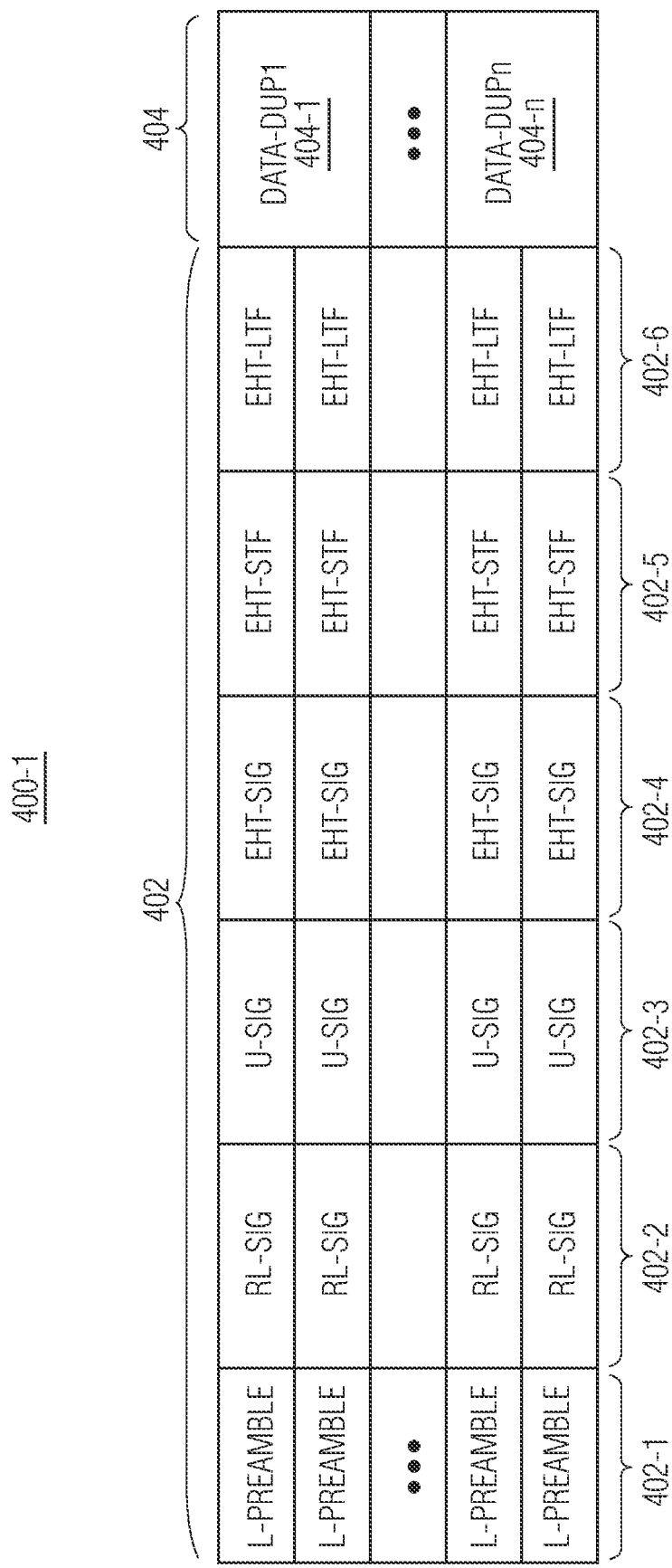
FIG. 4A depicts an example of a PPDU encoded with duplicated bits that may be transmitted by a wireless device in accordance with a PSD limit.

FIG. 4A depicts an example of a PPDU, 400-1, encoded with duplicated bits that may be transmitted by a wireless device in accordance with a PSD limit. In some embodiments, the PPDU 400-1 may be an EHT-DUP PPDU in accordance with the first ER transmission technique, such that the PPDU 400-1 improves the transmission range of PPDUs in a full-bandwidth transmission. In particular, FIG. 4A depicts a 20 MHz preamble portion 402 and a data portion 404 that are each included in the PPDU 400-1. With reference to FIG. 4A, each row included in the 20 MHz preamble portion 402 may represent a 20 MHz channel of a signal bandwidth, such that the signal bandwidth may be, for example, 80 MHz, 160 MHz, or 320 MHz. In some embodiments, bits encoded in the 20 MHz preamble portion of the PPDU 400-1 may include bandwidth information that indicates the signal bandwidth.

In an embodiment, the 20 MHz preamble portion 402 of the PPDU 400-1 includes six fields that are duplicated for each 20 MHz channel of the signal bandwidth. The six fields of the 20 MHz preamble portion 402 are implemented as a first field 402-1 (shown as including Legacy-Preamble field (L-Preamble)), a second field 402-2 (shown as including RL-SIG), a third field 402-3 (shown as including Universal Signal field (U-SIG)), a fourth field 402-4 (shown as including EHT Signal field (EHT-SIG)), a fifth field 402-5 (shown as including EHT-Short Training field (EHT-STF)), and a sixth field 402-6 (shown as including EHT-Long Training field (EHT-LTF)). In some embodiments, "duplicated" may imply that the contents (e.g., data, information, bits, etc.) of each field for a 20 MHz channel are duplicated across the signal bandwidth and/or are the same for each corresponding field in other 20 MHz channels of the PPDU. For example, the contents of the first field 402-1 (shown as L-Preamble) in a first 20 MHz channel (shown by the first row) of the PPDU 400-1 may be repeated and/or the same as the contents of the first field in a second 20 MHz channel (shown by the second row), a third 20 MHz channel (shown by the third row), a fourth 20 MHz channel (shown by the fourth row), a fifth 20 MHz channel (shown by the fifth row), and/or other 20 MHz channels (not shown) included in the signal bandwidth of the PPDU. In some embodiments, duplication and or phase rotation of each 20 MHz channel included in the 20 MHz preamble portion 402 may be performed via the duplicator and phase rotator 208 for signal bandwidths less than 320 MHz, or either the first duplicator and phase rotator 208-1 or the second duplicator and phase rotator 208-2 for signal bandwidths of at least 320 MHz.

In an embodiment, the data portion 404 of the PPDU 400-1 may include two or more segments, implemented as Data-DUP1 404-1 to Data-DUPn 404-$n$, such that "n" represents the total number of segments, which is an integer greater than one. In such an embodiment, each data segment (e.g., Data-DUP1 404-1 to Data-DUPn 404-$n$) may be modulated using a basic bandwidth that is duplicated across the signal bandwidth. In an embodiment, the basic bandwidth may be smaller than the signal bandwidth and may be defined as a portion of the signal bandwidth. For example, the data portion 404 of the PPDU 400-1 shown in FIG. 4A is modulated using a 40 MHz basic bandwidth and is duplicated across an 80 MHz signal bandwidth, such that Data-DUP1 404-1 covers 40 MHz and Data-DUPn 404-$n$ covers 40 MHz.

In other embodiments (not shown), the basic bandwidth may also be 20 MHz, 80 MHz, or 160 MHz and the signal bandwidth may be greater than 80 MHz, such that there may be more than two segments or less than two segments included in the data portion 404. For example, a 320 MHz signal bandwidth may include two 160 MHz segments when modulated using a 160 MHz basic bandwidth, four 80 MHz segments when modulated using an 80 MHz basic bandwidth, eight 40 MHz segments when modulated using a 40 MHz basic bandwidth, or sixteen 20 MHz segments when modulated using a 20 MHz basic bandwidth. As another example, a 160 MHz signal bandwidth may include one 160 MHz segment when modulated using a 160 MHz basic bandwidth, two 80 MHz segments when modulated using an 80 MHz basic bandwidth, four 40 MHz segments when modulated using a 40 MHz basic bandwidth, or eight 20 MHz segments when modulated using a 20 MHz basic bandwidth.

In some embodiments, each data segment (e.g., Data-DUP1 404-1 and/or Data-DUPn 404-$n$) may be modulated by the BPSK-DCM modulator 206 for signal bandwidths less than 320 MHz, or either the first BPSK-DCM modulator 206-1 or the second BPSK-DCM modulator 206-2 for signal bandwidths of at least 320 MHz. In some embodiments, duplication and or phase rotation of each data segment (e.g., Data-DUP1 404-1 and/or Data-DUPn 404-$n$) included in the data portion 404 may be performed via the duplicator and phase rotator 208 for signal bandwidths less than 320 MHz, or either the first duplicator and phase rotator 208-1 or the second duplicator and phase rotator 208-2 for signal bandwidths of at least 320 MHz.

With reference to FIG. 4A, in some embodiments, a per-basic bandwidth polarity change or a per-subcarrier phase rotation may be applied to the data portion 404, such that the polarity change or the per-subcarrier phase change may be applied to reduce PAPR. In some embodiments, when the data portion 404 is modulated on a basic bandwidth of 20 MHz that is duplicated across the signal bandwidth, the PPDU may be similar to a non-HT DUP PPDU, but may include explicit signaling of data bandwidth information and modulation information. In some embodiments, the data portion 404 may therefore include bandwidth information, data rate information, decoding information, modulation information, etc. In some embodiments, the data portion 404 may use a data rate of at most BPSK. In some embodiments, in either DUP modulation bandwidth, the modulation may implement each allowed modulation within a DUP bandwidth such as, for example, a modulation order of at most BPSK-DCM.

Figure 4B:
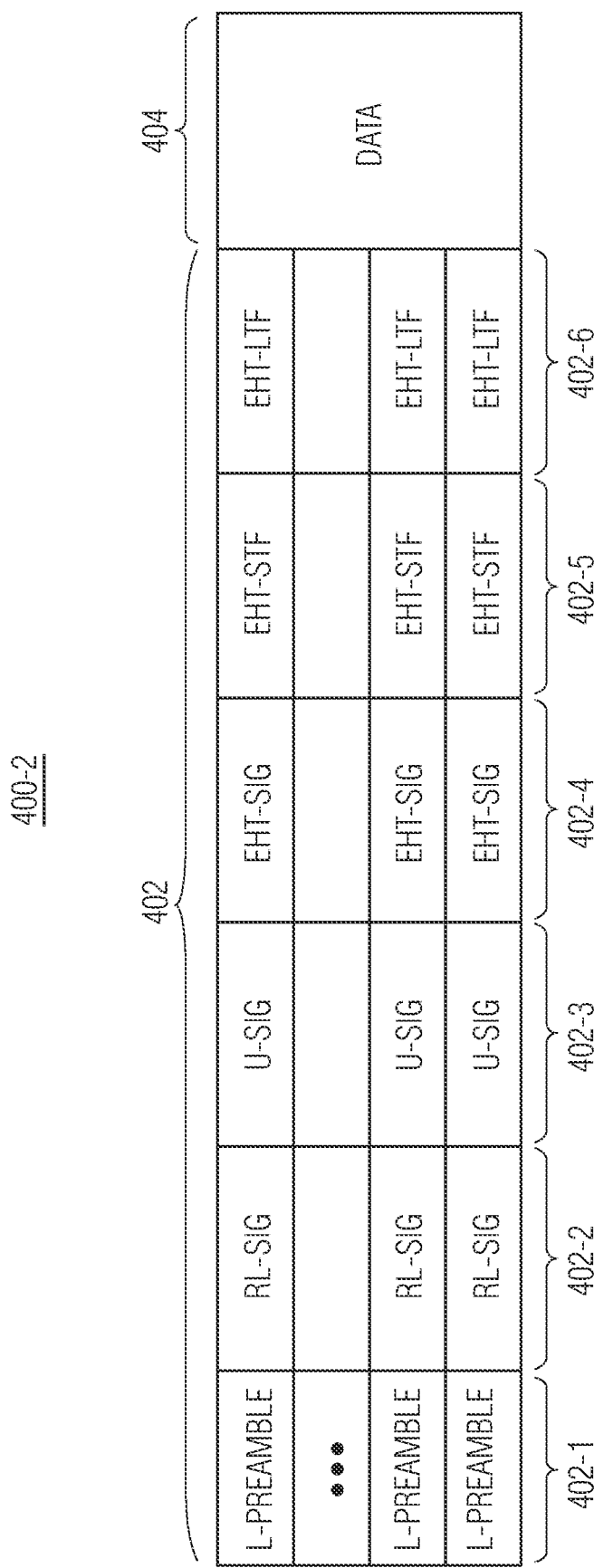
FIG. 4B depicts another example of a PPDU encoded with duplicated bits that may be transmitted by a wireless device in accordance with a PSD limit.

FIG. 4B depicts another example of a PPDU, 400-2, encoded with duplicated bits that may be transmitted by a wireless device in accordance with a PSD limit. In some embodiments, the PPDU 400-2 may use a data rate of at most BPSK-DCM in accordance with the second ER transmission technique, such that the PPDU 400-2 improves the transmission range of PPDUs in a full-bandwidth transmission. In particular, FIG. 4B depicts a 20 MHz preamble portion 402 and a data portion 404 that are each included in the PPDU 400-2. With reference to FIG. 4B, each row included in the 20 MHz preamble portion 402 may represent a 20 MHz channel of a signal bandwidth, such that the signal bandwidth may be, for example, 80 MHz, 160 MHz, or 320 MHz. In some embodiments, bits encoded in the 20 MHz preamble portion of the PPDU 400-2 may include bandwidth information that indicates the signal bandwidth.

In an embodiment, the 20 MHz preamble portion 402 of the PPDU 400-2 includes six fields that are duplicated for each 20 MHz channel of the signal bandwidth. The six fields of the 20 MHz preamble portion 402 are implemented as a first field 402-1 (shown as including L-Preamble), a second field 402-2 (shown as including RL-SIG), a third field 402-3 (shown as including U-SIG), a fourth field 402-4 (shown as including EHT-SIG), a fifth field 402-5 (shown as including EHT-STF), and a sixth field 402-6 (shown as including EHT-LTF). In some embodiments, "duplicated" may imply that the contents (e.g., data, information, bits, etc.) of each field for a 20 MHz channel are duplicated across the signal bandwidth and/or are the same for each corresponding field in other 20 MHz channels of the PPDU. For example, the contents of the first field 402-1 (shown as L-Preamble) in a first 20 MHz channel (shown by the first row) of the PPDU 400-2 may be repeated and/or the same as the contents of the first field in a second 20 MHz channel (shown by the second row), a third 20 MHz channel (shown by the third row), a fourth 20 MHz channel (shown by the fourth row), and/or other 20 MHz channels (not shown) included in the signal bandwidth of the PPDU. In some embodiments, duplication and or phase rotation of each 20 MHz channel included in the 20 MHz preamble portion 402 may be performed via the duplicator and phase rotator 208 for signal bandwidths less than 320 MHz, or either the first duplicator and phase rotator 208-1 or the second duplicator and phase rotator 208-2 for signal bandwidths of at least 320 MHz.

In an embodiment, the data portion 404 of the PPDU 400-2 may include a data segment (shown as Data) that is modulated using the signal bandwidth of the PPDU. For example, the data portion 404 of the PPDU 400-2 shown in FIG. 4B is modulated using an 80 MHz signal bandwidth, such that the data portion 404 covers four 20 MHz channels. However, in other embodiments (not shown), the signal bandwidth may be greater than 80 MHz, such that the data portion 404 may cover more than four 20 MHz channels. For example, the data portion 404 of the PPDU 400-2 may have a 320 MHz signal bandwidth or a 160 MHz signal bandwidth that may include sixteen 20 MHz channels or eight 20 MHz channels, respectively. In such an embodiment, the data portion 404 may be modulated using a data rate of at most BPSK-DCM, such that a lower-rate modulation scheme may be defined for the PPDU 400-2. For example, the lower-rate modulation scheme may be Quadruple Carrier Mapping (QCM), BPSK-DCM+DUP, a one fourth coding rate, or other lower-rate modulation scheme.

In some embodiments, the data portion 404 may be modulated by the BPSK-DCM modulator 206 for signal bandwidths less than 320 MHz, or either the first BPSK-DCM modulator 206-1 or the second BPSK-DCM modulator 206-2 for signal bandwidths of at least 320 MHz. In some embodiments, duplication and/or phase rotation of each 20 MHz channel covered by the data segment 404 may be performed via the duplicator and phase rotator 208 for signal bandwidths less than 320 MHz, or either the first duplicator and phase rotator 208-1 or the second duplicator and phase rotator 208-2 for signal bandwidths of at least 320 MHz.

With reference to FIG. 4B, when the lower-rate modulation scheme is BPSK-DCM+DUP, the bits included in the data portion 404 of the PPDU 400-2 may be encoded and modulated using one fourth of data subcarriers included in the signal bandwidth. In an embodiment, the bits modulated using one fourth of the data subcarriers may be duplicated onto four segments of the signal bandwidth. For example, for a signal bandwidth of at most 160 MHz, bits included in the data portion of the PPDU may be encoded and modulated using one fourth of data subcarriers included in the signal bandwidth, such that bits modulated using one fourth of the data subcarriers may be duplicated onto four subblocks of the signal bandwidth. As another example, for a signal bandwidth of at least 320 MHz, bits included in the data portion of the PPDU may be parsed into two data segments and may be encoded and modulated using one fourth of data subcarriers included in each segment, such that the bits modulated using one fourth of the data subcarriers may be duplicated onto four segments of the signal bandwidth.

With further reference to FIG. 4B, in some embodiments, a polarity change (e.g., +1/−1) or a per-subcarrier phase rotation may also be applied to each duplication of the data subcarriers onto the four subblocks of a segment within the signal bandwidth to reduce PAPR. In one example, per-subcarrier phase rotation or polarity change for each duplication may involve:

$$d_{k+\frac{N}{4}*s} = e^{j(k+\frac{N}{4}*s)\pi} d_k \quad (1)$$

According to (1), d represents a modulated value and k represents a subcarrier index within a segment which is represented by s. Additionally, N represents the number of subcarriers in a signal bandwidth and j represents a phase implemented by the per-subcarrier phase rotation.

As another example, per-subcarrier phase rotation or polarity change for each duplication may involve:

$$d_{k+\frac{N}{4}*s} = \text{conj}(d_k) \quad (2)$$

According to (2), a per-subcarrier conjugate (shown as conj($x_k$)) may be applied for each duplication if s is odd. Additionally, in an embodiment, per-subcarrier phase rotation or polarity change may be added to (2). In such an embodiment, the per-subcarrier conjugate may be applied to each duplication of the data subcarriers onto four segments of a signal bandwidth.

Figure 4C:
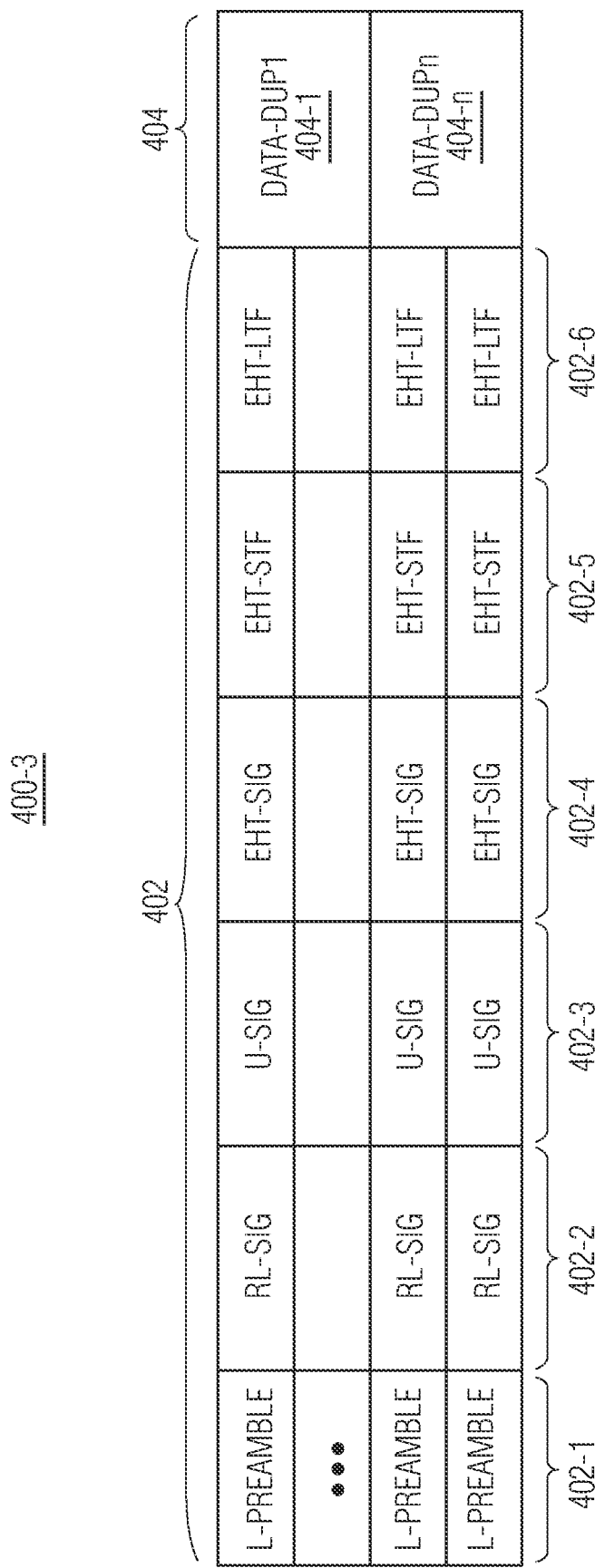
FIG. 4C depicts another example of a PPDU encoded with duplicated bits that may be transmitted by a wireless device in accordance with a PSD limit.

FIG. 4C depicts another example of a PPDU, 400-3, encoded with duplicated bits that may be transmitted by a wireless device in accordance with a PSD limit. In some embodiments, the PPDU 400-3 may be an EHT-DUP PPDU that uses a data rate of at most BPSK-DCM in accordance with the third ER transmission technique, such that the PPDU 400-3 improves the transmission range of PPDUs in a full-bandwidth transmission. In particular, FIG. 4C depicts a 20 MHz preamble portion 402 and a data portion 404 that are each included in the PPDU 400-3. With reference to FIG. 4C, each row included in the 20 MHz preamble portion 402 may represent a 20 MHz channel of a signal bandwidth, such that the signal bandwidth may be, for example, 80 MHz, 160 MHz, or 320 MHz. In some embodiments, bits encoded in the 20 MHz preamble portion of the PPDU 400-3 may include bandwidth information that indicates the signal bandwidth.

In an embodiment, the 20 MHz preamble portion 402 of the PPDU 400-3 includes six fields that are duplicated for each 20 MHz channel of the signal bandwidth. The six fields of the 20 MHz preamble portion 402 are implemented as a first field 402-1 (shown as including L-Preamble), a second field 402-2 (shown as including RL-SIG), a third field 402-3 (shown as including U-SIG), a fourth field 402-4 (shown as including EHT-SIG), a fifth field 402-5 (shown as including EHT-STF), and a sixth field 402-6 (shown as including EHT-LTF). In some embodiments, "duplicated" may imply that the contents (e.g., data, information, bits, etc.) of each field for a 20 MHz channel are duplicated across the signal bandwidth and/or are the same for each corresponding field in other 20 MHz channels of the PPDU. For example, the contents of the first field 402-1 (shown as L-Preamble) in a first 20 MHz channel (shown by the first row) of the PPDU 400-3 may be repeated and/or the same as the contents of the first field in a second 20 MHz channel (shown by the second row), a third 20 MHz channel (shown by the third row), a fourth 20 MHz channel (shown by the fourth row), and/or other 20 MHz channels (not shown) included in the signal bandwidth of the PPDU. In some embodiments, duplication and or phase rotation of each 20 MHz channel included in the 20 MHz preamble portion 402 may be performed via the duplicator and phase rotator 208 for signal bandwidths less than 320 MHz, or either the first duplicator and phase rotator 208-1 or the second duplicator and phase rotator 208-2 for signal bandwidths of at least 320 MHz.

In an embodiment, the data portion 404 of the PPDU 400-3 may include one or more segments, implemented as Data-DUP1 404-1 to Data-DUPn 404-*n*, such that "n" represents the total number of segments, which is an integer greater than one. In such an embodiment, each data segment (e.g., Data-DUP1 404-1 to Data-DUPn 404-n) may be modulated using a basic bandwidth that is duplicated within at least one data segment of the signal bandwidth. In an embodiment, the basic bandwidth may be smaller than the signal bandwidth and may be defined as a portion of the signal bandwidth. For example, the data portion 404 of the PPDU 400-3 shown in FIG. 4C includes two data segments (e.g., Data-DUP1 404-1 to Data-DUPn 404-n), such that each data segment is 160 MHz and is modulated using an 80 MHz basic bandwidth and is duplicated within the 160 MHz data segment of the 320 MHz signal bandwidth, such that Data-DUP1 404-1 covers 160 MHz and Data-DUPn 404-n covers 160 MHz. As another example (not shown), the data portion 404 of the PPDU 400-3 shown in FIG. 4C may include one data segment, such that the data segment is 160 MHz and is modulated using an 80 MHz basic bandwidth and is duplicated within the 160 MHz signal bandwidth.

In some embodiments, a signal within each basic bandwidth may be one data segment (e.g., Data-DUP1 404-1 to Data-DUPn 404-n) may be modulated by the BPSK-DCM modulator 206. In some embodiments, phase rotation across the basic bandwidth of each data segment (e.g., Data-DUP1 404-1 to Data-DUPn 404-n) in the data portion 404 may be performed via the duplicator and phase rotator 208 for signal bandwidths less than 320 MHz, or either the first duplicator and phase rotator 208-1 or the second duplicator and phase rotator 208-2 for signal bandwidths of at least 320 MHz.

With reference to FIG. 4C, in some embodiments, each basic bandwidth within the data portion 404 may be modulated using a data rate of at most BPSK-DCM, such that a lower-rate modulation scheme may be defined for the PPDU 400-3. For example, the lower-rate modulation scheme may be QCM, BPSK-DCM+DUP, a one fourth coding rate, or other lower-rate modulation scheme. In some embodiments, a per-basic bandwidth polarity change or a per-subcarrier phase rotation may be applied to the data portion 404, such that the polarity change or the per-subcarrier phase change may be applied to reduce PAPR.

In some embodiments, for a wideband low rate transmission, a data rate of BPSK-DCM may be combined with N times duplication, such that the lowest data rate may be 1/(2N) of BPSK for a PPDU encoded with duplicated bits and transmitted by a wireless device in accordance with a PSD limit. In such an embodiment, N may be an integer greater than zero that represents a duplication level. For example, when the duplication level is two (e.g., N=2), the lowest data rate for an EHT PPDU may be one fourth of that of BPSK. In some embodiments, the lowest data rate used by a PPDU may be BPSK-DCM+DUP. As an example, a data portion using a data rate of BPSK-DCM+DUP may implement MCS0+DCM+2× duplication when encoding the data portion of a PPDU with a signal bandwidth of 80 MHz (e.g., 80 MHz MCS0–DCM with 2× duplication), 160 MHz (e.g., 160 MHz MCS0–DCM with 2× duplication), or 320 MHz (e.g., 320 MHz MCS0–DCM with 2× duplication).

In some embodiments, when implementing MCS0–DCM with duplication, bits (e.g., information bits) included in a data portion of a PPDU may be encoded using bandwidth X/N MHz, such X represents a signal bandwidth and N represents a duplication level with an integer greater than zero. In such an embodiment, DCM modulates the bits and duplicates the bits N times. Furthermore, implementing MCS0–DCM with duplication may involve at least one of two encoding/modulation techniques described herein.

According to a first encoding/modulation technique, encoding/modulation may be implemented via MCS0–DCM and duplicated with phase rotation. In some embodiments, the first encoding/modulation technique may encode and modulate bits onto a segment using half of a signal bandwidth (e.g., X/N MHz (N=2)), then duplicate the bits encoded and modulated onto the segment onto another segment (e.g., the other half of the signal bandwidth). In such an embodiment, a different phase rotation may be added per-duplication or per-segment.

According to the first encoding/modulation technique, for a signal bandwidth of at most 80 MHz, DCM modulation may be performed within X/N MHz and a different phase rotation may be applied per-duplication (e.g., X/N MHz). Alternatively, for a signal bandwidth greater than 80 MHz, encoded bits may be parsed onto different 80 MHz segments, such that DCM modulation may be performed within each segment. In addition, for the signal bandwidth greater than 80 MHz, a different phase rotation may be applied per-segment, per-duplication (e.g., X/N MHz), or per-basic bandwidth, such that the phase rotation may involve:

$$d'_{k+i*\frac{N_{SD}}{2}} = d'_k * e^{j\theta_{i,k}} \quad (3)$$

According to (3), $k=0, 1, \ldots (N_{SD}/2)-1$, $i=0, 1, 2, \ldots, N-1$, $N_{SD}$ represents the total number of data subcarriers for the signal bandwidth (e.g., X/N MHz or an 80 MHz segment), $\theta_{i,k}$ represents the phase rotation for each subcarrier in each of the four segments of the signal bandwidth, such that the four segments each represent one fourth of the signal bandwidth, and $d'_k$ represents a modulated signal for 1/(2N) of data subcarriers.

$$d'_{k+i*\frac{N_{SD}}{2}} = d'_k * e^{j\theta_i} \quad (4)$$

According to (4), $e^{j\theta_{i,k}} = e^{j\theta_i}$ may be simplified to use one phase rotation per-segment, per-duplication, or per-basic bandwidth, such that $i=0, 1, \ldots, N-1$. In one embodiment, phase rotation can be further simplified to $e^{j\theta_i} = +1$ or $-1$.

According to a second encoding/modulation technique, encoding/modulation may be implemented via a duplicate and variant DCM scheme. In some embodiments, the second encoding/modulation technique may encode bits (e.g., information bits) included in a data portion of a PPDU onto a segment using half of a signal bandwidth (e.g., X/N MHz (N=2)), then duplicate bits encoded onto the segment onto other segments N times, such that N may represent a maximum number of times a segment is duplicated. In such an embodiment, within each duplication or segment, variant DCM schemes may be applied. In such an embodiment, additional phase rotation may also be added per-duplication or per-segment.

According to the second encoding/modulation technique, bits may be encoded using X/N MHz, such that X represents a signal bandwidth and N represents the maximum number of times a segment may be duplicated. In some embodiments, for a signal bandwidth of at most 80 MHz, DCM modulation may duplicate encoded bits onto an X/N MHz segment (e.g., a segment may be one fourth of the signal bandwidth) and apply a variant DCM modulation scheme onto each duplication. Alternatively, for a signal bandwidth greater than 80 MHz, encoded bits may be parsed onto different 80 MHz segments, such that DCM modulation may be performed within each segment. As an example, a similar subcarrier-subcarrier DCM as specified by the IEEE 802.11ax communication protocol may be used with a different per-subcarrier phase ($\theta_{i,k}$) in each segment.

$$d'_{k+i*\frac{N_{SD}}{2}} = d'_k * e^{j\theta_{i,k}} \quad (5)$$

According to (5), k=0, 1, . . . , ($N_{SD}$/2)–1, i=0, 1, 2, . . . , N–1, $N_{SD}$ represents the total number of data subcarriers for the signal bandwidth (e.g., X/N MHz or an 80 MHz segment), $\theta_{i,k}$ represents the phase rotation for each subcarrier in each of the four segments of the signal bandwidth, such that the four segments each represent one fourth of the signal bandwidth, and $d'_k$ represents a modulated signal for 1/(2N) of data subcarriers.

$$d'_{k+i*\frac{N_{SD}}{2}} = d'_k * e^{j\left(\left(k+\frac{N_{SD}}{2}+i\%2\right)\pi+\gamma_i\right)} \quad (6)$$

According to (6), k=0, 1, . . . , ($N_{SD}$/2)–1, i=0, 1, 2, . . . , Nseg, $N_{SD}$ represents the total number of data subcarriers for the signal bandwidth (e.g., X/N MHz or an 80 MHz segment), $d'_k$ represents a modulated signal for 1/(2N) of data subcarriers, and $\gamma_i$ represents an extra phase offset per-segment index. In such an embodiment, a similar π rotation per-subcarrier may be adopted by the second half of the DCM subcarriers, such that even/odd subcarrier flipping may occur per-segment.

$$d'_{k+i*\frac{N_{SD}}{2}} = d'_k * e^{j\gamma_i} \quad (7)$$

According to (7), k=0, 1, . . . , ($N_{SD}$/2)–1, i is an even integer, $N_{SD}$ represents the total number of data subcarriers for the signal bandwidth (e.g., X/N MHz or an 80 MHz segment), $d'_k$ represents a modulated signal for 1/(2N) of data subcarriers, and $\gamma_1$ represents an extra phase offset per-segment index. In such an embodiment, mapping of a rotated version and an unrotated version may be flipped.

$$d'_k * e^{j\left(\left(k+\frac{N_{SD}}{2}+i\%2\right)\pi+\gamma_i\right)} = d'_{k+i*\frac{N_{SD}}{2}} \quad (8)$$

According to (8), k=0, 1, . . . , ($N_{SD}$/2)–1, i is an odd integer, $N_{SD}$ represents the total number of data subcarriers for the signal bandwidth (e.g., X/N MHz or an 80 MHz segment), $d'_k$ represents a modulated signal for 1/(2N) of data subcarriers, and $\gamma_i$ represents an extra phase offset per-segment index. In such an embodiment, mapping of a rotated version and an unrotated version may be flipped. In an embodiment, the extra phase offset $\gamma_i$ may be between 0 and π.

In one embodiment, for duplicated mode signaling, the first encoding/modulation technique may define a new Modulation and Coding Scheme (MC S) entry to signal MCS0–DCM with 2× duplication, such that the new MCS table may have MCS0~13, MCS0–DCM and MCS0–DCM with 2× DUP. In another embodiment, for duplicated mode signaling, the second encoding/modulation technique may add a separate bit or reuse one combination in U-SIG to indicate duplication. In such an embodiment, MCS0–DCM may be an MCS entry.

Figure 5:
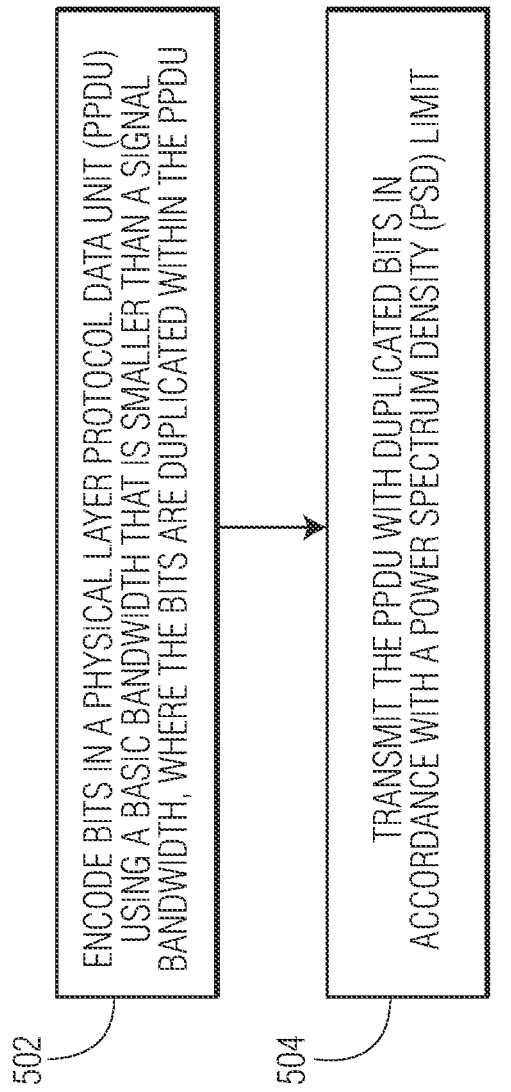
FIG. 5 illustrates a flow diagram of a technique for wireless communications in accordance with an embodiment of the invention.

FIG. 5 illustrates a flow diagram of a technique for wireless communications in accordance with an embodiment of the invention. At block 502, bits may be encoded in a PPDU using a basic bandwidth that is smaller than a signal bandwidth, where the bits are duplicated within the PPDU. At block 504, the PPDU with duplicated bits may be transmitted in accordance with a PSD limit.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for wireless communications, the method comprising:
encoding bits in a Physical Layer Protocol Data Unit (PPDU) using a basic bandwidth that is smaller than a signal bandwidth, wherein the bits are duplicated within the PPDU; and
transmitting the PPDU with the bits that are duplicated in accordance with a power spectrum density (PSD) limit, wherein an index in a modulation and coding scheme (MCS) field in the PPDU indicates the bits are duplicated, wherein the index identifies an MCS0-Dual Carrier Modulation (DCM) with 2 times Duplication (2×DUP) entry in an MCS table.

2. The method of claim 1, wherein the PPDU is a non-Orthogonal Frequency-Division Multiple Access (non-OFDMA) PPDU transmitted via a duplicated transmission.

3. The method of claim 1, wherein a duplicated PPDU format is used when the PPDU is at least one of a Media Access Control (MAC) control frame and a MAC management frame.

4. The method of claim 3, wherein the duplicated PPDU format is a non-High-Throughput (non-HT) duplicate (DUP) PPDU format, and wherein the basic bandwidth uses a non-HT PPDU format.

5. The method of claim 3, wherein the basic bandwidth of the duplicated PPDU format uses at least one of a duplicated High-Efficiency (HE) single-user (SU) PPDU and a duplicated HE extended range (ER) single user PPDU (ER-SU PPDU).

6. The method of claim 1, wherein bits encoded in a 20 MHz preamble portion of the PPDU include bandwidth information that indicates the signal bandwidth;
wherein the bits encoded in the 20 MHz preamble portion of the PPDU are duplicated across the signal bandwidth; and
wherein a data portion of the PPDU uses a data rate lower than a data rate of binary phase shift keying (BPSK).

7. The method of claim 6, wherein the data portion of the PPDU is modulated using the basic bandwidth that is duplicated within at least one data segment of the signal bandwidth; and
wherein at least one of a first per-subcarrier phase rotation is applied to the data portion of the PPDU based on an even tone in the data portion and a second per-subcarrier phase rotation is applied to the data portion of the PPDU based on an odd tone in the data portion.

8. The method of claim 1, wherein the basic bandwidth is at least one of 20 MHz, 40 MHz, 80 MHz, and 160 MHz.

9. The method of claim 6, wherein the data portion of the PPDU is modulated using the signal bandwidth and a data rate defined by binary phase shift keying dual carrier modulation and duplication (BPSK-Dual Carrier Modulation (DCM)+DUP).

10. The method of claim 9, wherein for a signal bandwidth of at most 160 MHz, bits included in the data portion of the PPDU are encoded and modulated using one fourth of data subcarriers included in the signal bandwidth; and
wherein the bits modulated using one fourth of the data subcarriers are duplicated onto four subblocks of the signal bandwidth.

11. The method of claim 9, wherein for a signal bandwidth of at least 320 MHz, bits included in the data portion of the PPDU are parsed into two data segments and are encoded and modulated using one fourth of data subcarriers included in each segment; and
wherein the bits modulated using one fourth of the data subcarriers are duplicated onto four segments of the signal bandwidth.

12. The method of claim 9, wherein at least one of a polarity change and the per-subcarrier phase rotation is applied to each duplication of the data subcarriers onto the four subblocks of a segment within the signal bandwidth.

13. The method of claim 9, wherein a per-subcarrier conjugate is applied to each duplication of the data subcarriers onto four segments of the signal bandwidth.

14. The method of claim 6, wherein:
the data portion of the PPDU is modulated using at least one of a 40 MHz bandwidth and an 80 MHz bandwidth that is duplicated across the signal bandwidth; and
the data portion uses a data rate of at least one of a Quadrature Carrier Modulation (QCM), BPSK-DCM+DUP, and a one fourth coding rate.

15. The method of claim 14, wherein when the data portion uses the data rate of BPSK-DCM+DUP, the data portion is encoded via modulation coding scheme index 0 dual carrier modulation duplicated by two (MCS0+DCM+2× duplication).

16. The method of claim 14, wherein bits included in the data portion of the PPDU are encoded and modulated onto a segment using half of the signal bandwidth, and wherein the bits encoded and modulated onto the segment are duplicated onto another segment.

17. The method of claim 14, wherein bits included in the data portion of the PPDU are encoded onto a segment using half of the signal bandwidth;
wherein the bits encoded onto the segment are duplicated onto other segments N times; and
wherein N is a maximum number of times a segment is duplicated.

18. The method of claim 1, wherein when the PPDU is transmitted in a frequency band of less than 6 GHz, there is no PSD limit for the transmission of the PPDU; and
wherein frequency bands utilized in a less than 6 GHz range include at least one of Unlicensed National Information Infrastructure (U-NII)-1, U-NII-2A, U-NII-2B, U-NII-2C, U-NII-3, U-NII-4, or U-NII-5.

19. The method of claim 1, wherein when the PPDU is transmitted in a frequency band of 6 GHz, the PSD is limited to 5 dBm per 1 MHz for an Access Point (AP) and −1 dBm per 1 MHz for a non-AP station (STA); and
wherein frequency bands utilized within a 6 GHz range include at least one of U-NII-5, U-NII-6, U-NII-7, or U-NII-8 U-NII-5, U-NII-6, U-NII-7, and U-NII-8.

20. A wireless device, the wireless device comprising:
a processor configured to:
encode bits in a Physical Layer Protocol Data Unit (PPDU) using a basic bandwidth that is smaller than a signal bandwidth, wherein the bits are duplicated within the PPDU; and
transmit the PPDU with the bits that are duplicated in accordance with a power spectrum density (PSD) limit, wherein an index in a modulation and coding scheme (MCS) field in the PPDU indicates the bits are duplicated, wherein the index identifies an MCS0-Dual Carrier Modulation (DCM) with 2 times Duplication (2×DUP) entry in an MCS table.

21. The method of claim 1, wherein the MCS table includes separate entries for MCS0 to MCS13 modulation and MCS0-DCM in addition to the entry for MCS0-DCM with 2×DUP.

22. The wireless device of claim 20, wherein the MCS table includes separate entries for MCS0 to MCS13 modulation and MCS0-DCM in addition to the entry for MCS0-DCM with 2×DUP.

* * * * *